June 8, 1937.  E. M. KRUEGER  2,083,070
LIQUID REGISTERING DEVICE
Filed Nov. 5, 1934   2 Sheets-Sheet 1

INVENTOR
Emil M. Krueger
BY Wheeler, Wheeler and Wheeler
ATTORNEYS

June 8, 1937.      E. M. KRUEGER      2,083,070
LIQUID REGISTERING DEVICE
Filed Nov. 5, 1934         2 Sheets-Sheet 2

INVENTOR
Emil M. Krueger
BY Wheeler, Wheeler & Wheeler
ATTORNEYS

Patented June 8, 1937

2,083,070

UNITED STATES PATENT OFFICE

2,083,070

LIQUID REGISTERING DEVICE

Emil M. Krueger, Milwaukee, Wis., assignor to Badger Meter Manufacturing Company, Milwaukee, Wis., a corporation of Wisconsin Application November 5, 1934, Serial No. 751,513

8 Claims. (Cl. 73—258)

This invention relates to improvements in liquid registering devices.

It is a primary object of this invention to provide a new and improved form of a liquid registering meter in which the operative life of the device has been prolonged by reorganization and redesign of the parts.

More specifically it is an object to protect from exposure to the liquid passing through the meter those portions of the device subject to corrosion through electrolytic or alkaline action.

It is a still further object to protect the working parts of the meter, particularly the gear train and spindle disc assembly, from impeding and abrasive actions of foreign particles such as sand and grit, through the use of a tight fitting gear train base and a sand ring cylinder separating such parts from the liquid carrying such sediment.

It is a further object of the invention to provide a novel gear train mounting involving the elimination of some separate frame elements and the relocation of all necessary bolts in protected locations.

It is another object to provide a mounting and locking means for the metering disc chamber, whereby the discharge opening in said chamber can be positively positioned in registry with the discharge port in the meter housing.

In the drawings.

Like parts are identified throughout the several views by the same reference characters.

Figure 1:
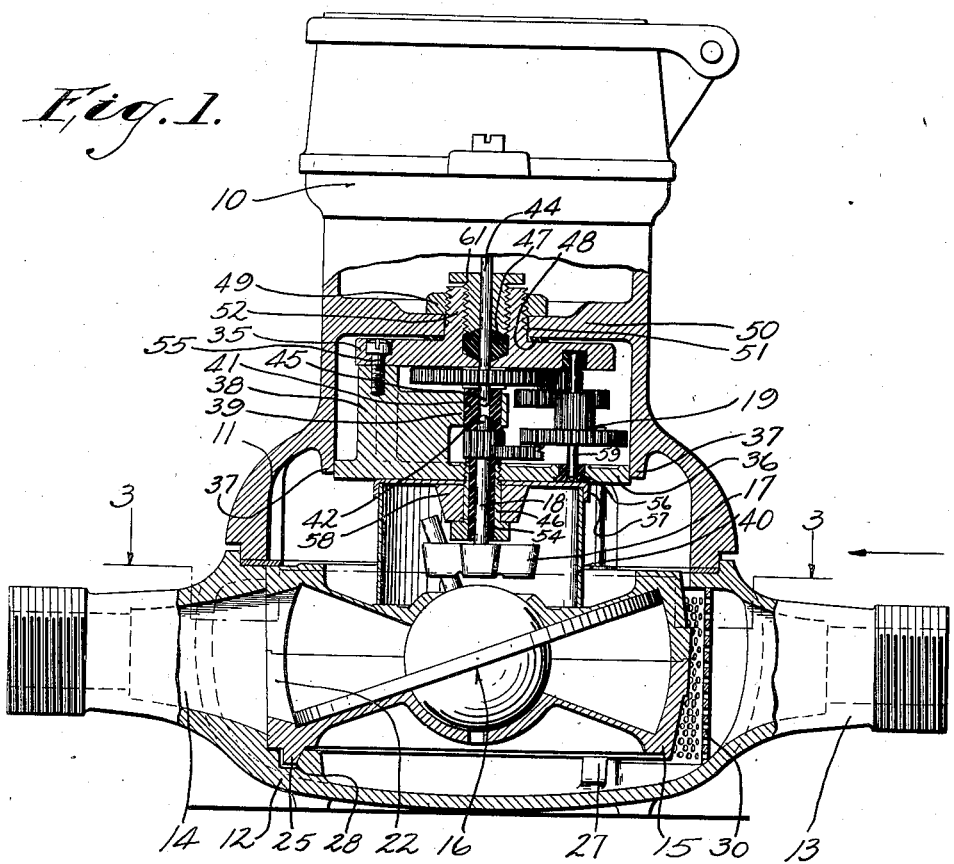
Figure 1 is a vertical cross section of a water meter showing an embodiment of my invention.

Referring specifically to Figure 1, it will be noted that I show many conventional features of a commonly used wobble type disc liquid register including the register case 10, meter housing top 11, meter housing bottom 12, liquid entry port 13, liquid discharge port 14, disc chamber 15, disc and spindle unit 16, driving pawl 17 and drive shaft 18.

Figure 4:
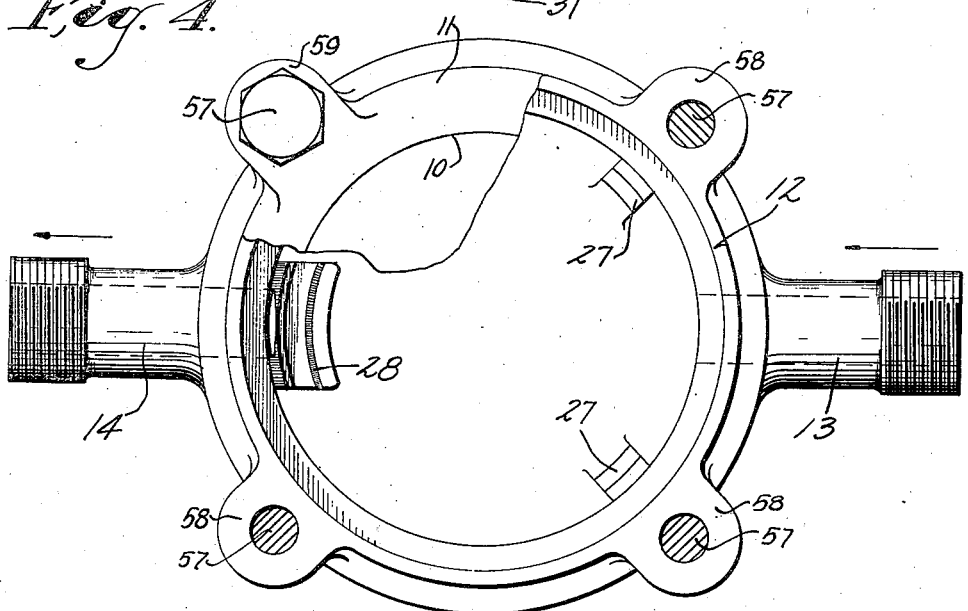
Figure 4 is a plan view showing the interior of the meter bottom.

Disc chamber 15 is provided below its discharge port 22 with an arcuately formed externally bevelled ear 25, Fig. 1, capable of being received in a similarly disposed complementarily formed and bevelled arcuate clamp channel 28 in the meter housing bottom 12. Levelling supports 27 for the chamber 15 are provided on the bottom 12, Fig. 4, at predetermined points. These supports 27 with the clamp ear 25 and the channel 28 position the chamber 15 at a proper level so that its opening 22 registers with the discharge port 14. Pressure by the top of the meter case assembly, in assembled relation, exerted on the top of the chamber 15, tends to clamp the flange 25 of the chamber 15 in position in the channel 28. The bevelled portions of the flange 25 and the channel 28 tend to force the chamber 15 laterally of the bottom 12 into closer contact with the outlet wall of the meter bottom 12, thus producing what is in effect a coacting bearing relation between the outlet wall of the bottom 12 and the coacting surface of the chamber 15, when the aforementioned pressure is applied upon the chamber 15. The required pressure may be developed by the cap screws 57 threaded into the ears 58 of the base and engaging the corresponding lugs 59 at the top of the casing, one such lug being shown in Fig. 4 and the general organization in this regard being conventional.

Figure 3:
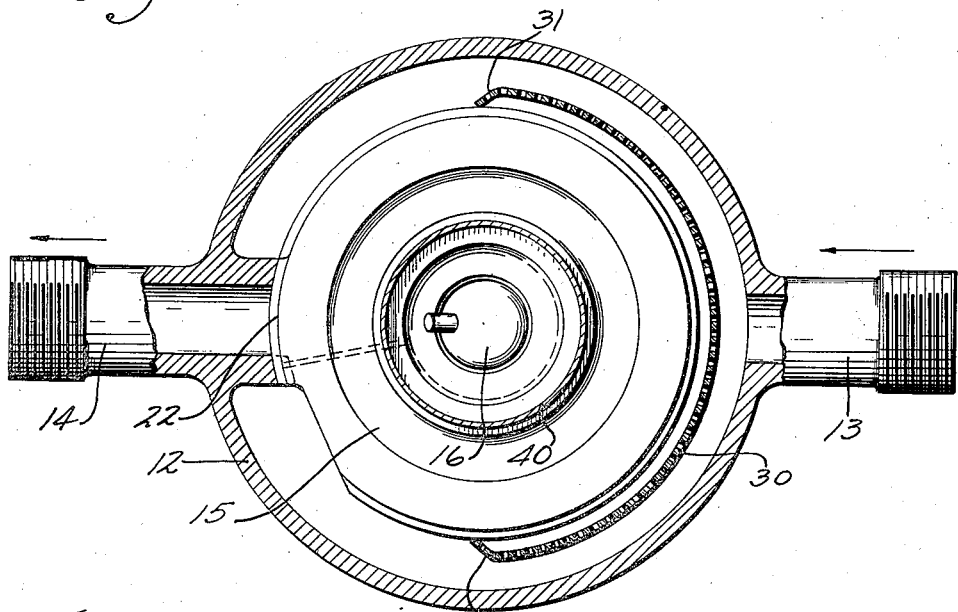
Figure 3 is a horizontal cross section taken on the line 3—3 of Figure 1.

The screen 30, best shown in Figure 3, has obliquely formed spacing ends 31 contacting the wall of the chamber 15 about which it is disposed. Screen 30 is substantially of the same vertical height as the chamber 15, and it is mounted to contact the upper and lower wall portion of the bottom 12, thus forcing any liquid entering by way of port 13 to pass therethrough before entering chamber 15.

The meter housing top 11 has a partition 50 apertured at 51 to receive the neck 52 of the top frame member 35 of the gear train assembly 19. Member 35 is secured in position by a lock nut 49 threaded to the neck 52. Packing washers 47 and 48 further maintain the watertight nature of the assembly, the washer 48 externally and the washer 47 internally of the neck 52. An adjustable screw plug 61 is threaded in the neck 52 for compressing washer 47.

Figure 2:
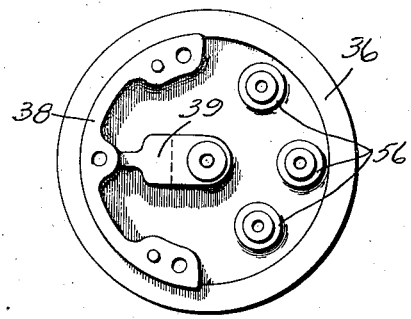
Figure 2 is a plan view of the gear frame base element.

The bottom frame member 36, Fig. 2, is circular in shape and secured to upper frame member 35 by bolts 55. It fits closely within the circular apron 37 of the meter housing top 11. Member 36 has a vertically rising semicircular support portion 38 integral therewith and providing a mounting arm 39 in which is mounted a bushing 41. Bushing 41 receives the end 42 of the driving shaft 18 and the end 45 of the driven shaft 44.

A tubular sleeve 46 threaded into the lower frame member 36 extends therebeneath and provides support for the bushing 54 about the shaft 18. It is headed at its lower end to engage a conically tapered thrust member 58 whereby an apertured sand ring cap 57 is held to the bottom frame member 36 in any desired position of rotation. The sand ring cap is adjustable about the tubular sleeve 46 to present new bearing surfaces to the lower end of the intermediate spindle 59 which extends through bushing 56 in the bottom frame member 36 into thrust engagement with sand ring cap 57.

A sand ring chamber 40 tightly fitting within the cap 57, is mounted upon the top of chamber 15 to enclose the pawl 17 and the spindle disc assembly 16.

When the upper and lower meter units are assembled and it is desired to lock the two together, a conventional clamping or locking means is applied outside the device. When assembled, pressure of the meter housing top 11 will be communicated through the frame member 35 secured in the partition 50, the portion 38, lower frame member 36, sand ring cap 57, and said ring wall 40 to the chamber 15 positively forcing the chamber 15 into position, not only to maintain the discharge opening 22 in registry with the discharge port 14 but to provide a bearing contact with the side walls of the meter housing bottom 12 by the movement of the bevelled ear 25 in the channel 28.

In general the operation of parts in the metering device has not been affected by this invention except to insure a better and more prolonged operation. Water or any other liquid entering the registering device by way of port 13 must pass through the screen 30 before it can enter the disc chamber 15. The larger bits of sediment will be stopped at the screen 30. Screens are not new in the art but positioning this one as I have, by means of the arms 31, is new, and I thus provide a new and advantageous organization for proper meter operation.

As water passes about the chamber 15 it was formerly free to deposit the finer sediments upon the open gear train assembly 19 and the spindle and disc assembly 16, thereby permitting abrasive and impeding actions as the case might be. My sand ring casing 40 tightly fitted upon the chamber 15 and secured to the base member 36 now excludes all sediment from entry to chamber 15 by way of spindle opening on top thereof. The tight fitting annular frame member 36 and the apron 37 of the meter housing top 11 create a similar condition for the gear train assembly 19.

It is to be noted that all of my locking means are outside the flow of liquid. The meter top 11 is secured to the meter housing bottom 12 externally of the device. The lock nut 49 holding the upper frame member 35 in the partition 50 is in the register chamber and is thus out of the line of the liquid flow. With this new organization there is very little possibility of internal disorganization by the inadvertent release of any locking means through action of the liquid. Each part internally of the register is coacting in maintaining the relative position of each with the other due to the pressure action which has been previously described.

Corrosive action which might tend to cause the cap screws 55 to stick, is minimized by the fact that such screws are located in the gear chamber. Likewise the gears in said chamber are protected both from corrosive action and from foreign matter inasmuch as said chamber is closed from the meter proper by the partition disk 36 and the sleeve 37. While the joint at this point is not sufficiently tight to exclude water, it does virtually prevent any flow through the gear chamber, thus eliminating any renewal of the chemical agencies in the water which, by renewal, might cause corrosion.

I claim:

1. In a liquid registering device, a meter housing bottom having an inlet port and an outlet port, a metering disc chamber therein, a discharge opening in said metering disc chamber, a bearing surface adjacent discharge opening in said metering disc chamber, a bearing surface adjacent said discharge port in said meter housing bottom, coacting means comprising a beveled ear connected beneath said disc chamber, a beveled channel in said meter housing bottom receiving said ear, whereby when pressure is applied upon said metering disc chamber said beveled portions force said bearing surfaces into positive engagement with each other.

2. In a liquid registering device, a meter housing bottom having an inlet port and an outlet port, a meter housing top secured to said bottom and containing the register mechanism, a disc chamber disposed in said meter housing bottom, a discharge opening upon said disc chamber having a bearing surface adjacent thereof, a bearing surface adjacent said discharge port in said meter housing bottom, coacting means for maintaining said bearing surfaces in positive contact comprising a beveled ear connected beneath said disc chamber, a beveled channel receiving said ear whereby when pressure is applied upon said disc chamber said bearing surfaces will be engaged and leveling supports upon said meter housing bottom for said metering disc chamber.

3. In a liquid registering device, a meter housing bottom having an inlet port and an outlet port and a disc chamber therein, a sand ring chamber mounted upon said disc chamber, a sand ring cap for said sand ring chamber, a lower gear train frame member having a bearing support section, retaining members positioning said sand ring cap about said bearing support section, a meter housing top having an apron, a disc portion on said lower frame member whereby when the said disc portion of said gear train member is positioned by said apron, the sand ring cap and chamber are retained in position upon said disc chamber.

4. In a liquid registering device, a meter housing bottom having an inlet port and an outlet port, a meter housing top secured to said bottom and containing means for applying pressure on a disk chamber, a disc chamber disposed in said meter housing bottom, means for positioning said chamber therein, said means comprising a plurality of raised supports in predetermined relation upon said bottom, a beveled clamp channel in said bottom, an arcuately beveled ear on the lower face of said disc chamber and co-operating with said channel whereby when pressure is applied upon said disc chamber by the meter housing top through said pressure applying means the disc chamber moves laterally of the meter housing bottom into contact with the side wall of the said meter housing bottom to hold the disc chamber in registry with the outlet port.

5. In a meter, the combination with a frame providing bearings for meter shafts, of a shaft projecting through one of said bearings and said frame, and a disk provided with means for its rotatable adjustment on said frame in a position to take the end thrust of the shaft extending through said bearing upon different surfaces of said disk according to the rotative adjustment thereof.

6. In a meter, the combination with a gear train and a frame therefor having shaft bearings, of a shaft projecting through one of said bearings and projecting from said frame, a second shaft projecting through another of said bearings, clamping means concentric with the first mentioned shaft, and a disk provided to receive said first mentioned shaft and engaged between said clamping means and said frame for rotatable adjustment about said first mentioned shaft, said disk extending beneath the end of said second mentioned shaft to receive the thrust thereof and adapted in its rotative adjustment to present fresh surfaces to said second mentioned shaft.

7. In a meter, the combination with a casing including a bottom and top, the bottom having a port and being provided with a cam surface sloping toward said port, of a metering chamber having a complementary port and cam surface co-operative with said first mentioned surface to force said chamber into engagement with the bottom of said casing about the respective ports when the meter chamber is subjected to pressure, a metering device in said metering chamber having a motion transmitting connection projecting through the top of the chamber, a gear train comprising a driven connection to said motion transmitting connection to be actuated thereby and including a gear frame support operatively connected with the top of the meter casing, a sand ring enclosing said connections and confined between said frame and said meter chamber, and means for securing together the bottom and top of said casing under pressure transmitted through said frame and sand ring to said meter chamber to force said chamber into operative engagement with the bottom of said casing.

8. In a meter the combination with a casing including a bottom and top, the bottom having a port and being provided with a cam surface sloping toward said port, of a metering chamber having a complementary port and cam surface co-operative with the first mentioned surface to force said chamber into intimate engagement with the bottom of the casing about the respective ports when the metering chamber is subjected to pressure, a metering device and a metering chamber having a driving connection, a gear train comprising a driven connection operatively disposed to be actuated by said driving connection and including a gear frame support operatively connected with the top of the meter casing and sufficiently rigid to transmit pressure, a pressure transmitting means engaged by the gear frame support and engaging the top of said chamber for the transmission to said chamber from said casing top of pressure in a direction to maintain the chamber in intimate contact with the bottom of the casing as aforesaid, and means for securing together the bottom and top of said casing, whereby to develop the aforesaid pressure.

EMIL M. KRUEGER.